May 20, 1958  G. E. SPILKER  2,835,066
FISHING ROD HOLDER
Filed Dec. 27, 1955
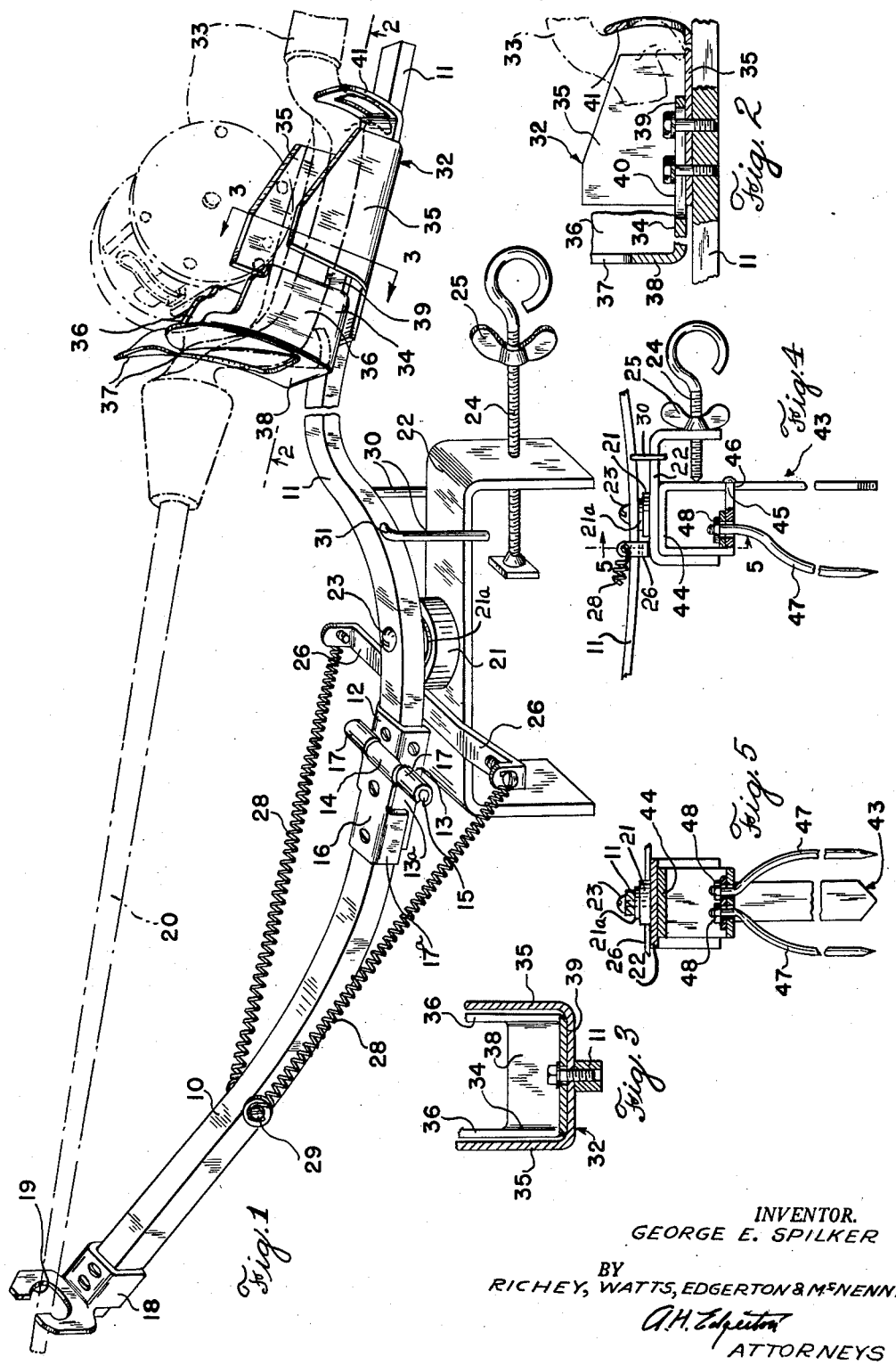
INVENTOR.
GEORGE E. SPILKER
BY
RICHEY, WATTS, EDGERTON & McNENNY
A.H. Edgerton
ATTORNEYS

United States Patent Office 2,835,066
Patented May 20, 1958

2,835,066

FISHING ROD HOLDER

George E. Spilker, Cleveland, Ohio

Application December 27, 1955, Serial No. 555,625

5 Claims. (Cl. 43—21.2)

This invention relates broadly to fishing rod holders and more specifically to a rod supporting structure for use in trolling or still fishing from a boat or from the shore of a body of water.

One of the objects of the invention is to provide a rod holder which may be locked in a fixed position or released to facilitate limited swinging movement in a horizontal plane in order to attract or play the fish after the initial strike.

Another object of the invention is to provide a holder which is designed to resist the tensive strains imposed upon the rod yet facilitate the removal thereof with ease and dispatch.

Another object of the invention is to provide a rod supporting structure which is hinged intermediate its ends to accommodate the folded adjustment thereof so the holder may be stored and/or carried in a fishing tackle box of normal size.

Further objects of the invention reside in the provision of a holder which is light in weight, sturdy of structure, economic of manufacture and organized to accommodate the retention of rods of various size and form.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a view in perspective of the improved fishing rod holder;

Fig. 2 is a vertical section of a fragmentary portion thereof, the section being taken on the line 2—2 of Fig. 1;

Fig. 3 is a vertical section of a portion of the reel and handle support, the section being taken on the line 3—3 of Fig. 1;

Fig. 4 is a side elevational view of the holder tripod; and

Fig. 5 is a vertical section thereof taken on the line 5—5 of Fig. 4.

Referring first to Fig. 1, the rod holder comprises an outer arcuate bar 10 and an inner ogee bar 11 disposed in coaxial relation and hinged together, intermediate their ends, so the upper faces thereof may lie in confronting relation when the holder is folded. The hinge comprises a plate 12 affixed to the inner end of the bar 11 having depending side walls 13 engaged with the sides of the bar 11 and protruding end sections 13a that overlie the contiguous portion of the bar 10. The central portion of the plate 12 is sheared and rolled to form a tubular journal bearing 14 for a hinge pin 15. The mating plate 16 of the hinge is affixed to the inner end of the bar 10 and is formed with spaced tubular journal bearings 17 transaxially aligned with the bearing 14 to receive the pin 15. The plate 16 is formed with depending sides engaged with the bar 10 and end portions 17a enlarged laterally for telescopic engagement with the protruding end sections 13a of the side walls 13 of the plate 12. The free end of the bar 10 is provided with a bracket 18 folded to engage the top and side walls of the bar, and further bent with a vertically disposed plate having an open slot 19 in the top thereof for the reception of the fishing rod 20.

The inner end of the bar 11 is mounted on an antifriction bearing 21 having the outer race thereof affixed to a channel frame or bracket 22 constructed to straddle the rail or transom of a boat or the head of a stake when the fishing rod is used on shore. The inner race 26 of the bearing 21 protrudes slightly above the upper face of the outer race and is clamped to the bar 11 by a bolt 23. The inner depending leg of the bracket 22 is drilled and tapped to receive a clamping screw 24 preferably provided with a jamb nut 25 on the outer end of the shank thereof. A cross rail 26 is secured upon the upper face of the bracket 22, the ends thereof being bent upwardly and pierced to retain contractile springs 28 anchored at their opposite ends to the bar 10 by a bolt 29.

The bar 11 may be restrained, if desired, from rotative movement relative to the bracket 22, by a keeper comprising a rod 30 mounted for rotation in a hole 31 drilled in the bar 11. The rod is formed with depending arms adapted to straddle the sides of the bracket 22 when folded thereover.

The outer end of the bar 11 is provided with a cradle 32 for the reception of the reel and rod handle 33. The cradle embodies a slidable inner frame 34 and a fixed outer frame 35. The frame 34 is formed with a pair of vertically disposed side walls 36 having inturned flanges 37 on the forward end thereof and a short vertical flange 38 struck from the base of the cradle and bent upwardly. The flanges 37 are spaced to define a slot for entry of the rod 20, and the side walls 36 and flanges 37 are configured to receive the reel, but arrest transverse and axial movement of the reel when mounted therein. The base of the cradle 34 is formed with a tongue 39 in the center thereof having a slot 40 therein to receive machine screws threaded in the bar 11. Adjustment of the frame 34 will accommodate the support of fishing rod handles of various length. The outer frame 35 of the cradle is similar in structure to the frame 34, save only that an upwardly disposed flange 41 is provided in the rear thereof to restrain rearward axial movement of the rod, and the side walls 35 of the frame are formed for telescopic engagement with the side walls 36 of the frame 34 of the cradle.

When the holder, as described above, is used in fishing from the shore, the bracket 22 is clamped upon a stake 43 having a rectangular hollow top portion 44, preferably formed by folding the metal about a square arbor and riveting the end of a tongue 45 thereon in an opening 46 in the shank of the post or stake 43. Lateral and forward movement of the sake is restrained by a pair of rods 47 mounted for free swinging movement in the base fold of the top 44. The rods are retained by nuts 48 on the upper ends thereof within the void formed by the folded rectangular top of the stake. The rods 44, together with the shank of the stake, form a tripod when in use, but may be readily collapsed to facilitate the storage thereof.

From the forgoing it will be readily recognized that the bars 10 and 11, when adjusted in coaxial alignment, will be rigidly supported by the novel hinge structure, that the cradle will support the reel and handle of the fishing rod yet accommodate the ready removal thereof, that the springs will permit lateral swinging movement of the rod in order to lure the fish before it strikes and hold it thereafter, that the holder and stake may be folded into a relatively small package which will fit into a tackle box, and that the improved cradle will accommodate the use of rods of various size and form without untoward adjustment.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A fishing rod holder comprising a clamp, an antifriction bearing mounted thereon, a bar mounted on said bearing for lateral swinging movement, a second bar disposed in coaxial relation with the first named bar, a hinge secured to said bars intermediate the contiguous ends thereof, a bracket having a notch in the top thereof said bracket being mounted on the free end of the second named bar to receive a fishing rod, a cradle on the first named bar for the retention of the handle and reel of a fishing rod, said cradle comprising a movable front channel, spaced vertical flanges on the forward end thereof defining a notch for the reception of the handle and reel of a fishing rod, the side walls of said channel defining abutments engaged with a reel on the fishing rod handle to arrest transverse and forward axial movement of the reel and handle of a fishing rod, a telescopic fixed rear channel, a vertical flange in the rearward end thereof to restrain rearward axial movement of the handle of a fishing rod, and means in the first named channel for permitting adjustment thereof axially of the rod.

2. A fishing rod holder comprising a clamp, an antifriction bearing mounted thereon, a bar mounted on said bearing for lateral swinging movement, a second bar disposed in coaxial relation with the first named bar, a hinge secured to said bars intermediate the contiguous ends thereof for folding said bars in parallel relation, a cross rail on the top of said clamp, contractile springs mounted on the ends of said cross rail and affixed to the second named bar adjacent the outer end thereof, a notched bracket on the outer end of the second named bar for the support of a fishing rod, a cradle on the first named bar for the reception of the handle and reel of a fishing rod, said cradle comprising a rearward fixed channel and a forward axially adjustable channel, shoulders in said forward channel to restrain forward axial movement of the handle of a fishing rod, a shoulder on the end of the rearward channel to restrain rearward axial movement of the handle of a fishing rod, and means in the base of said forward channel for the permitting adjustment thereof axially of the rod.

3. A fishing rod holder comprising a clamp, an antifriction bearing mounted thereon, a bar mounted on said bearing for lateral swinging movement, a second bar disposed in coaxial relation with the first named bar, a hinge secured to said bars intermediate the contiguous ends thereof for folding said bars in overlapped relation, a cradle on the first named bar to support the reel and handle of a fishing rod, said cradle comprising a pair of sheet metal channels arranged in telescopic relation with the side flanges thereof disposed upwardly, shoulders in said channels to arrest forward and rearward movement of the handle and reel of a fishing rod mounted therein, and means in one of said channels permitting the axial adjustment thereof relative to the other.

4. A fishing rod holder comprising a clamp, an antifriction bearing mounted thereon, a bar mounted on said bearing for lateral swinging movement, a second bar disposed in coaxial relation with the first named bar, a hinge secured to said bars intermediate the contiguous ends thereof for permitting one of the bars to be folded on top of the other, a cross bar on the top of said clamp, contractile springs mounted on the ends of said cross bar and affixed to the second named bar adjacent the outer end thereof, a latch on the first named bar engageable with said clamp to restrain swinging movement of the holder, a bracket on the second named bar for the support of a fishing rod, and a pair of channel irons on the first named bar, the side flanges thereof defining a groove to receive the handle and reel of a fishing rod when dropped therein, and means in said channels to arrest lateral movement of the handle and reel of a fishing rod.

5. A fishing rod holder comprising a clamp, a bar pivotally mounted thereon, a second coaxial bar, a hinge secured to said bars intermediate the contiguous ends thereof, a cross arm on the top of said clamp, springs attached to the ends of said cross arm and to the second named bar adjacent the outer end thereof, a cradle on the first named bar to receive the reel and handle of a fishing rod, vertical side walls in said cradle to restrain transverse movement of the reel and handle of a fishing rod mounted in the cradle, and vertical end walls in said cradle to restrain axial movement of the reel and handle of a fishing rod dropped into said cradle.

References Cited in the file of this patent
UNITED STATES PATENTS

| | | |
|---|---|---|
| 2,564,625 | Jackson et al. | Aug. 14, 1951 |
| 2,576,212 | Carter | Nov. 27, 1951 |
| 2,661,563 | Adams et al. | Dec. 8, 1953 |